United States Patent
Hojnacki

[11] Patent Number: 6,026,537
[45] Date of Patent: Feb. 22, 2000

[54] WINDSHIELD WIPER BLADE ASSEMBLY

[75] Inventor: George Hojnacki, Commerce Twp., Mich.

[73] Assignee: Trico Products Corporation, Rochester Hills, Mich.

[21] Appl. No.: 09/070,330

[22] Filed: Apr. 30, 1998

[51] Int. Cl.[7] ................................................. B60S 1/38
[52] U.S. Cl. ............................ 15/250.451; 15/250.44
[58] Field of Search ........................ 15/250.451, 250.452, 15/250.453, 250.48, 245, 250.361, 250.43, 250.38

[56] References Cited

U.S. PATENT DOCUMENTS

| | | | |
|---|---|---|---|
| 2,589,339 | 3/1952 | Carson | 15/245 |
| 2,658,223 | 11/1953 | Enochian | 15/245 |
| 2,983,945 | 5/1961 | DePew | 15/250.42 |
| 3,003,174 | 10/1961 | Anderson | 15/250.42 |
| 3,041,654 | 7/1962 | Anderson | 15/250.42 |
| 3,076,993 | 2/1963 | Anderson | 15/250.42 |
| 3,131,413 | 5/1964 | Anderson | 15/250.42 |
| 3,158,890 | 12/1964 | Anderson | 15/250.42 |
| 3,192,551 | 7/1965 | Appel | 15/250.36 |
| 3,233,273 | 2/1966 | Anderson | 15/250.42 |
| 3,636,583 | 1/1972 | Rosen | 15/250.36 |
| 3,643,286 | 2/1972 | Wubbe | 15/250.38 |
| 3,696,497 | 10/1972 | Quinlan et al. | 29/407 |
| 3,785,002 | 1/1974 | Quinlan et al. | 15/250.36 |
| 3,808,630 | 5/1974 | Ito | 15/250.42 |
| 3,849,828 | 11/1974 | Cone | 15/250.452 |
| 3,872,537 | 3/1975 | Bianchi | 15/250.42 |
| 3,881,213 | 5/1975 | Tilli | 15/250.42 |
| 3,925,844 | 12/1975 | Cone | 15/250.452 |
| 3,930,279 | 1/1976 | Arman | 15/250.36 |
| 3,958,295 | 5/1976 | Green et al. | 15/250.39 |
| 3,995,347 | 12/1976 | Kohler | 15/250.42 |
| 4,028,770 | 6/1977 | Appel | 15/250.42 |
| 4,063,328 | 12/1977 | Arman | 15/250.42 |
| 4,075,731 | 2/1978 | Harbison et al. | 15/250.452 |
| 4,567,621 | 2/1986 | Alley, Jr. | 15/250.41 |
| 4,944,064 | 7/1990 | Verton | 15/250.42 |
| 5,044,042 | 9/1991 | Stratton | 15/250.41 |
| 5,235,720 | 8/1993 | Kinder | 15/250.4 |
| 5,325,564 | 7/1994 | Swanepoel | 15/250.42 |
| 5,327,615 | 7/1994 | Green | 15/250.4 |
| 5,392,488 | 2/1995 | Li | 15/250.41 |
| 5,412,834 | 5/1995 | Burkard et al. | 15/250.42 |
| 5,423,105 | 6/1995 | Scott | 15/250.4 |

*Primary Examiner*—Gary K. Graham
*Attorney, Agent, or Firm*—Bliss McGlynn, P.C.

[57] ABSTRACT

A windshield wiper blade including an elongated, flexible wiper element having a spine and a tip portion for wiping action against a windshield surface. The spine includes at least one elongated reinforcing and retaining vertebra for restraining the wiper element into a desired longitudinal orientation. The vertebra has an elongated body defining a thin, generally rectangular cross-section. The body is formed of a plurality of generally parallel fibers extending longitudinally internally of the body. The fibers are maintained in tension by cured resinous material which defines the exterior dimension of the body.

17 Claims, 3 Drawing Sheets

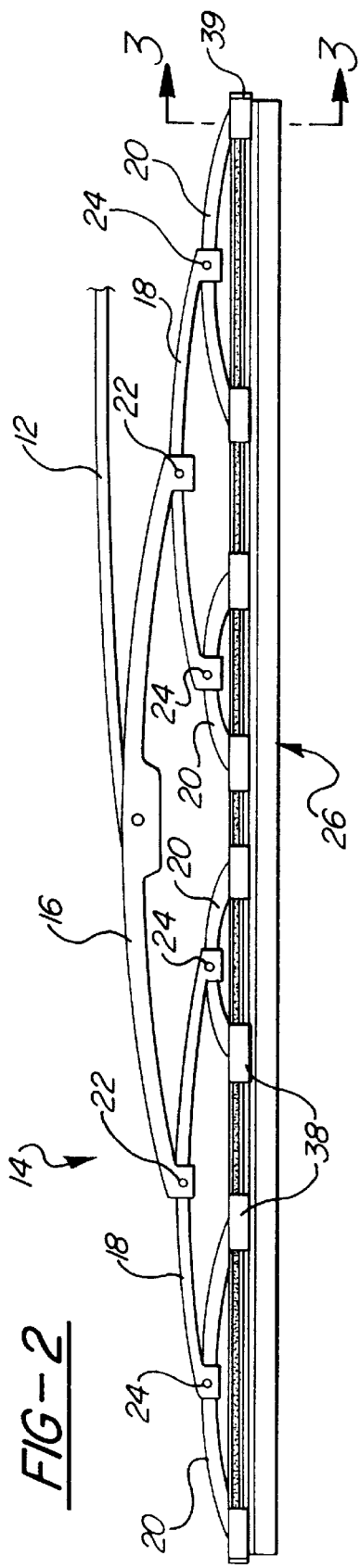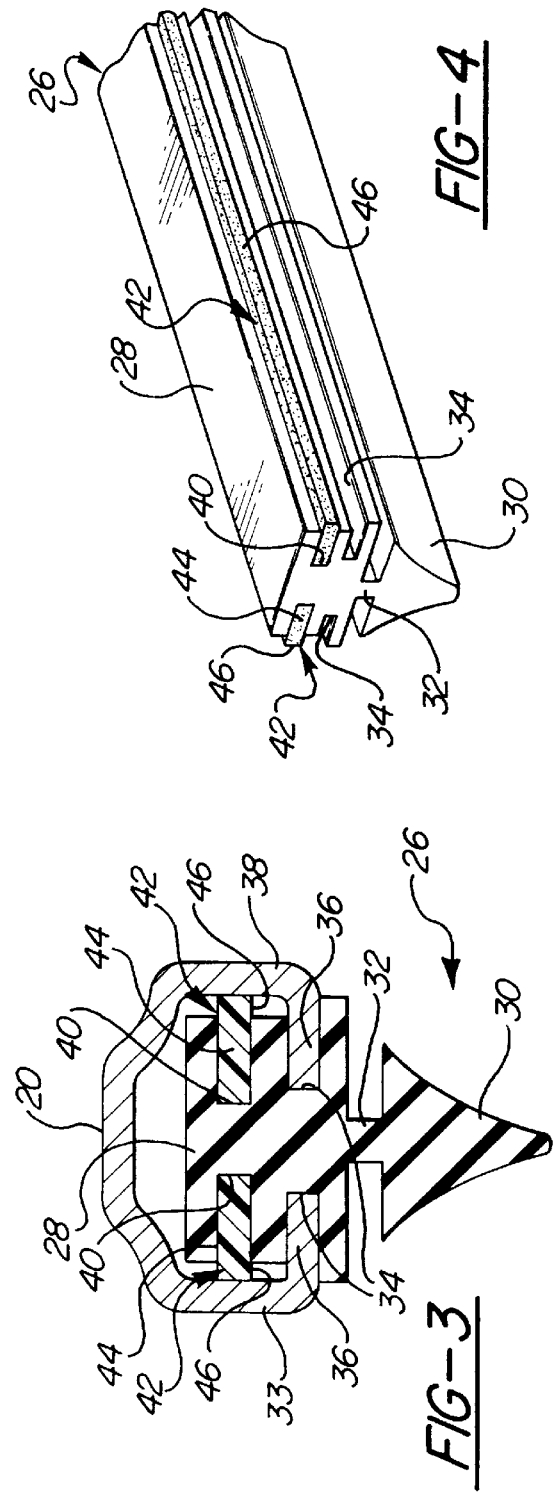

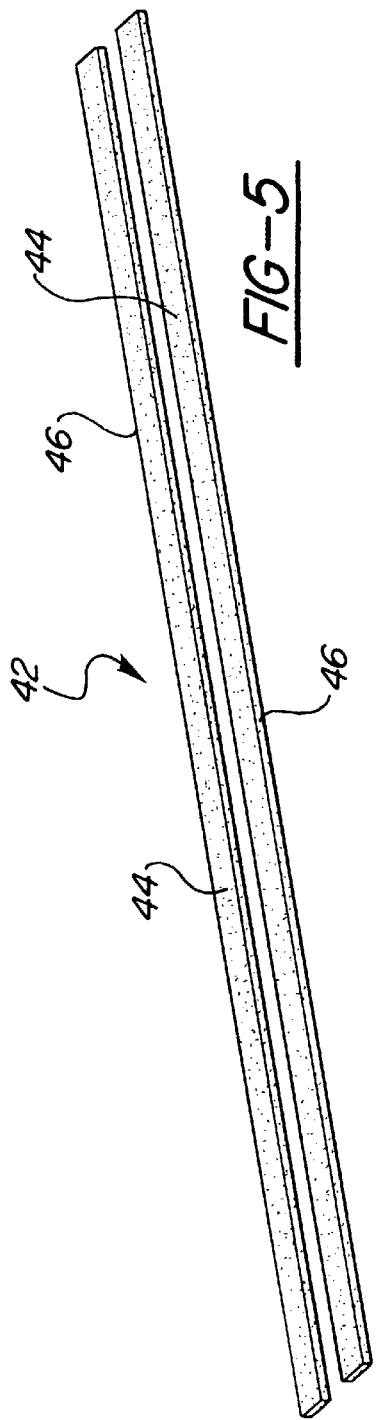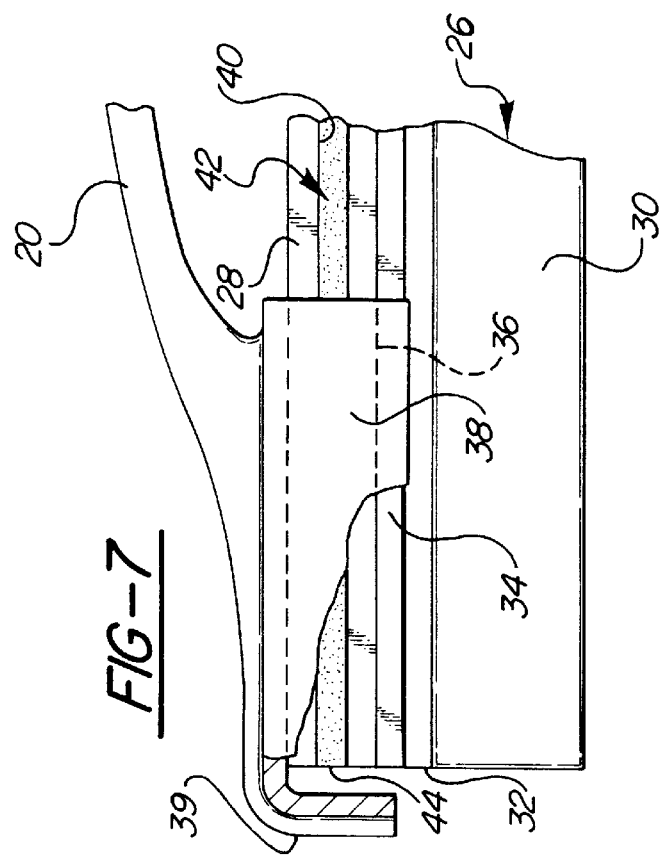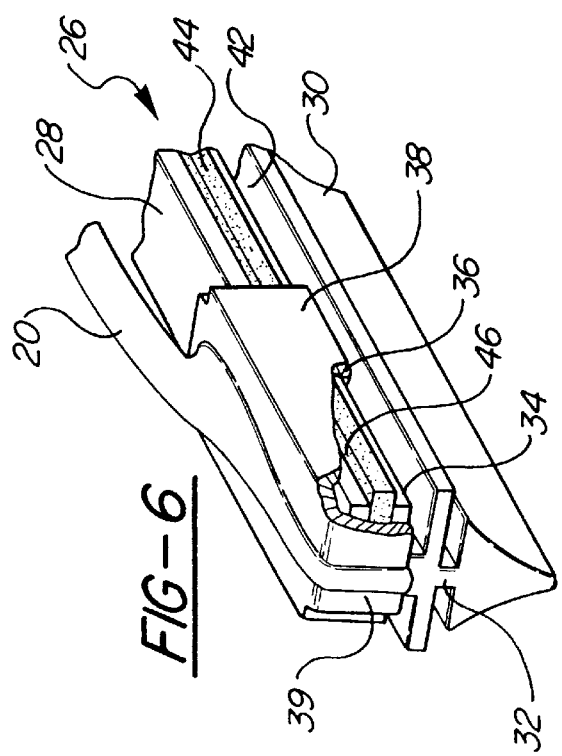

WINDSHIELD WIPER BLADE ASSEMBLY

BACKGROUND OF THE INVENTION

1. Field of the Invention

The present invention relates, generally, to windshield wiper blades and, more specifically to windshield wiper blades having lightweight, non-metallic reinforcement members which allow the wiping element to flex toward and away from the surface being wiped but which resists lateral flexing.

2. Description of the Related Art

Conventional windshield wiper blade assemblies commonly employed in the related art include some type of superstructure mounted to an arm which, in turn, is mounted adjacent the windshield and pivotally driven to impart reciprocating motion of the wiper blade across the windshield. A rubber wiping element is supported by the superstructure and contacts the windshield across the surface to be wiped. The wiper element often incorporates one or more metal (typically stainless steel) strips which act to reinforce the wiper element and facilitate wiping contact by the element across what is typically a curved glass surface. Thus, the reinforced wiping elements of the related art are usually designed to be uniformly flexible throughout their length in a direction toward and away from the windshield so that the pressure exerted from the arm through the superstructure to the wiping element will effect efficient cleaning of the windshield. In addition, these reinforced wiping elements are substantially rigid in the lateral direction as they are driven back and forth across the glass.

While reinforced wiping blades have performed admirably in the past, there remains a constant pressure to improve products, especially in the automotive related art. For example, the weight of each component is continually scrutinized and reviewed with a view toward effective reductions therein. The effort to reduce component and ultimately vehicle weight has a very high priority among automotive designers and component manufacturers such that even small reductions in component weight are encouraged wherever they may be safely found. This is also true of windshield wiper systems. The blade assembly is typically located on the end of the wiper arm and represents a significant portion of the inertia generated by the wiping system when in operation. Thus, any reduction in the blade mass will produce a concomitant reduction in the internal system loads and thereby improve the reliability of the wiper system as a whole.

Windshield wiper systems involve dynamic automotive components which are not only observed during operation but often heard. Reducing the noise generated by such assemblies during operation is a primary objective of windshield wiper system manufacturers and their OEM customers. The solution to these concerns must also be managed and balanced with the requirement that the windshield wiper blade assembly quickly shed water. Metal reinforcement strips employed in the related art often complicate these efforts, especially in cold weather where rain and snow have tendency to freeze up and form on the wiper element due, in part, to the metallic reinforcing strips.

Thus, there continues to be a need in the art for improvements in the windshield wiper systems which result in reduced weight of the wiper components, reduced noise during operation and improved hydrophobic qualities of the device.

SUMMARY OF THE INVENTION

The present invention addresses each one of these concerns in the related art in windshield wiper blade including an elongated, flexible wiper element having a spine and a tip portion for wiping action against a windshield surface. The spine includes at least one elongated reinforcing and retaining vertebra for restraining the wiper element into a desired longitudinal orientation. The vertebra has an elongated body defining a thin, generally rectangular cross-section. The body is formed by a plurality of generally parallel fibers extending longitudinally internally of the body. The fibers are maintained in tension by cured resinous material which defines the exterior dimensions of the body.

The fiber-filled, resinous vertebra allows flex in the wiper element in a direction toward and away from the windshield along the length of the wiper element but enjoys sufficient stiffness to resist flexing in the lateral direction resulting in good wipe quality. Importantly, the fiber-filled, resinous vertebra of the present invention reduces the weight of the wiper element over conventional designs using stainless steel vertebra. Furthermore, because the vertebra is not metal, noise is reduced at the point where the wiper element is mounted to the superstructure due to an elimination of metal to metal contact. The fiber-filled, resinous body of the vertebra of the present invention is also more hydrophobic than stainless steel, tending to better manage rain, snow and ice and allows the wiper element to flex better in wet or cold conditions.

Thus, one advantage of the present invention is that the wiper element employing the fiber-filled, resinous vertebra results in a reduction in the weight of the element while maintaining its flexibility toward and away from the windshield and its lateral stiffness. System inertia and internal leads are also reduced which improves the reliability and useful life of the wiper motor as well as the system as a whole.

Another advantage of the present invention is that it reduces the noise generated during operation of the windshield wiper assembly by eliminating points of metal to metal contact.

Another advantage of the present invention is that it is hydrophobic and manages rain, snow and ice in an improved manner over the related art.

Still another advantage of the present invention is that these improvements are achieved without any cost penalty when compared to wiper elements employing stainless steel vertebra. Thus, the windshield wiper blade of the present invention is a lightweight, strong, quiet, reliable and cost-effective to manufacture.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2 is a side view of the blade assembly of the present invention;

FIG. 3 is a cross-sectional end view taken substantially along lines 3—3 of FIG. 2;

FIG. 4 is a partial perspective view of the wiper element of the present invention;

FIG. 5 is a perspective view of the vertebra of the present invention;

FIG. 6 is a partial perspective view illustrating the wiper element mounted to the tertiary lever; and FIG. 7 is a side view of the wiper element mounted to a tertiary lever.

DETAILED DESCRIPTION OF THE PREFERRED EMBODIMENT(S)

Figure 1:
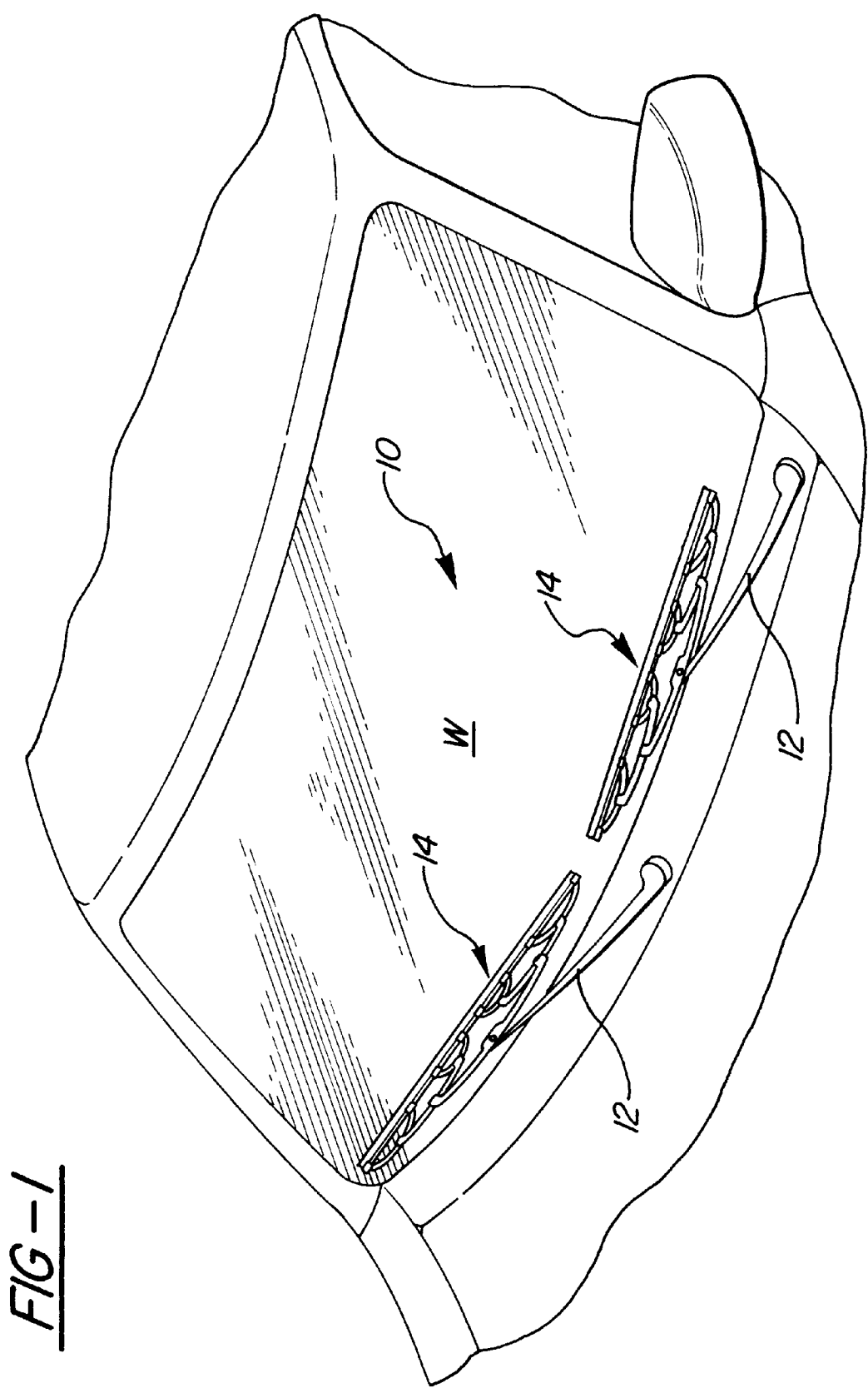
FIG. 1 is a partial perspective view of the front of an automotive vehicle illustrating the windshield wiper system 10 of the present invention.

Referring now to FIGS. 1 and 2, a windshield wiper system is generally indicated at 10 where like numbers are used to designate like structure throughout the drawings. The windshield wiper system 10 includes an arm, generally indicated at 12 and a blade assembly, generally indicated at 14 which is mounted to the arm 12. The arm 12 is mounted adjacent the windshield of a vehicle and pivotally driven to impart reciprocating motion to the blade assembly 14 across the windshield W, as commonly known in the art.

As best shown in FIG. 2, the blade assembly 14 has a "tournament" style superstructure including a primary lever 16 carried by the arm 12, two secondary levers 18, and a series of two or more tertiary levers 20. The secondary levers 18 are articulated to the primary lever 16 at pivot points 22 located at the opposed, lateral ends of the primary lever 16. Similarly, the tertiary levers 20 are each articulated to a secondary lever 18 at pivot points 24 located at the opposed lateral ends of the secondary levers 18. As illustrated in the Figures, the blade assembly 14 includes one primary lever 16, two secondary levers 18 and four tertiary levers 20, but those of ordinary skill in the art will appreciate from the discussion that follows that the blade assembly superstructure may take any number of different forms without departing from the scope of the invention.

The blade assembly 14 also includes an elongated rubber wiper element, generally indicated at 26. As best shown in FIGS. 3 and 4, the wiper element 26 has a spine 28, a tip portion 30 and a hinge 32 interconnecting the spine 28 and the tip 30. The tip portion 30 has a "delta" shape in cross-section and is the working end of the wiper element 26 which is operable for wiping action against a glass windshield surface. The hinge 32 allows the tip portion 30 to pivot slightly with respect to the glass surface of the windshield thereby improving wipe quality. The arm 12 includes a biasing mechanism (not shown) such as a spring that creates a force which is distributed to the wiper element 26 through the superstructure to clean the windshield.

The wiper element 26 is mounted to the superstructure and this may be accomplished in a number of different ways. As illustrated in the Figures, the wiper element 26 includes a pair of opposed, longitudinally extending, laterally outward opening grooves 34 which extend along the length of the spine 28. These two grooves 34 are adapted to cooperatively receive the fingers 36 of the mounting claws 38 formed at the opposed, distal ends of the tertiary levers 20. The spine 28 is gripped by the claws 38 in a manner well known in the art at spaced locations along the length of the wiper element 26. In addition, the wiper element 26 is constrained longitudinally by end tabs 39 formed adjacent the claws 38 on the outer ends of the outermost tertiary levers 20 as illustrated in FIGS. 6 and 7.

The spine 28 also includes a pair of opposed, longitudinally extending, laterally outward opening slots 40 which are formed in the spine 28 just above the pair of grooves 34, as best shown in FIG. 3. Each of the slots 40 receives a reinforcing and retaining vertebra, generally indicated at 42. The vertebra restrain the wiper element 26 into a desired longitudinal orientation and cooperate with the claws 38 and end tabs 39 to mount the wiper element 26 to the superstructure. More specifically, the vertebra 42 have an elongated body 44 defining a thin, generally rectangular cross-section which is dimensioned to fit partially within the slots 40. The body 44 also has a portion 46 which partially extend laterally outward from the slots 40 along the substantial longitudinal length of the wiper element 26. As best shown in FIG. 3, the portion 46 of the vertebra 42 extending outwardly of the slots 40 is abutted by the claw 38 which retains the vertebra laterally within the slots 40. Like the wiper element 26 itself, the vertebra 42 are also constrained longitudinally by the end tabs 39.

The vertebra body 44 is formed of a plurality of generally parallel glass fibers extending longitudinally internally of the body 44. The fibers are maintained in tension by cured resinous material which defines the external dimensions of the body 44. The fibers are dispersed uniformly through the cross-section of the vertebra body 44. The resinous material is an epoxy made of a thermoset plastic. In the preferred embodiment, the thermoset plastic epoxy may be a vinyl ester. The glass fibers form between 63% and 82% of the cross-sectional area of the vertebra body 44. More specifically and preferably, the glass fibers form between 67% and 77%, and ideally 75% of the cross-sectional area of the vertebra body.

The vertebra 42 is manufactured using a pultrusion process wherein the continuous glass fibers are encapsulated in the epoxy matrix. The process consists of pulling the glass fibers through a bath of premixed epoxy followed by pulling the composite through a heated die where the epoxy is cured with the fibers in tension. The composite is then cut to length so as to conform to the length of the spine This process produces a vertebra having a stiff, constant section structure of the body which can have various shapes.

In the preferred embodiment, the vertebra body 44 takes the form of an elongated, thin, rectangular strip having a thickness of approximately 1.3 mm. The glass/epoxy composite body 44 of the vertebra 42 has a density that is 3.8 times lower than that of stainless steel making it lighter than this material. At the same time, there is no cost penalty for employing the pultruded composite body 44 of the vertebra 42 of the present invention. Moreover, the epoxy in the composite is more hydrophobic than stainless steel which allows the blade assembly 14 to flex better when wet and cold in a direction toward and away from the windshield. The hydrophobic nature of the composite epoxy body 44 also manages rain, snow and ice better than stainless steel vertebra and thus resists the formation of ice or packed snow thereon. As pultruded, the vertebra 42 is black in appearance which improves its reflectivity compliance. In addition, noise is reduced during operation because the metal claws 38 and end tabs 39 do not contact another metal piece as is commonly done in the related art.

Because the vertebra 42 of the present invention reduces the weight of the blade assembly 14, there is a reduction in the inertia generated by the wiping system when in operation. This produces less wear in the bearings which support the reciprocal motion of the blade assembly. Furthermore, the motor torque required to run the system may also be reduced which increases motor life and reliability.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A windshield wiper blade comprising:

an elongated, flexible wiper element having a spine and a tip portion for wiping action against a windshield surface;

said spine including at least one elongated reinforcing and retaining vertebra for restraining said wiper element into a desired longitudinal orientation;

said vertebra having an elongated body defining a thin, generally rectangular cross-section, said body formed of a plurality of generally parallel fibers extending longitudinally internally of said body, said fibers being maintained in tension by cured resinous material which defines the exterior dimension of said body.

2. A windshield wiper blade as set forth in claim 1 wherein said fibers are dispersed uniformly through the cross-section of said vertebra body.

3. A windshield wiper blade as set forth in claim 1 wherein said fibers form between 63% and 82% of the cross-sectional area of said vertebra body.

4. A windshield wiper blade as set forth in claim 1 wherein said fibers form between 67% and 77% of the cross-sectional area of said vertebra body.

5. A windshield wiper blade as set forth in claim 1 wherein said fibers form 75% of the cross-sectional area of said vertebra body.

6. A windshield wiper blade as set forth in claim 1 wherein said fibers are glass fibers.

7. A windshield wiper blade as set forth in claim 1 wherein said resinous material is a thermoset plastic.

8. A windshield wiper blade as set forth in claim 1 wherein said resinous material is vinyl ester.

9. A windshield wiper blade as set forth in claim 1 wherein said spine includes opposed, longitudinally extending, laterally outward opening slots, said slots each receiving a reinforcing and retaining vertebra for restraining said wiper element into a desired longitudinal orientation;

said vertebra body dimensioned to fit partially within said slots and partially extending laterally outward from said slots along the substantial longitudinal length of said wiper element.

10. A windshield wiper blade assembly comprising:

an elongated, flexible wiper element having a spine and a tip portion for wiping action against a windshield surface;

a wiper superstructure including claws cooperatively engaging said spine of said wiper element at spaced locations along the longitudinal length thereof so as to mount said wiper element to said superstructure;

said spine including a pair of opposed, longitudinally extending, laterally outward opening slots, each of said slots receiving a reinforcing and retaining vertebra for restraining said wiper element into a desired longitudinal orientation and for cooperating with said claw to mount said wiper element to said superstructure;

each of said vertebra having an elongated body defining a thin, generally rectangular cross-section dimensioned to fit partially within said slots and partially extending laterally outward from said slots along the substantial longitudinal length of said wiper element and cooperatively engaged by said claws, each vertabra body being formed of a plurality of generally parallel fibers extending longitudinally internally of said body within a cured resinous material which maintains said plurality of parallel fibers in tension and defines the exterior dimensions of said body, and each of said vertebra allowing flexing of said wiper element in a direction generally perpendicular to the longitudinal axis of said wiper element and substantially along the length thereof while at the same time resisting flexing in a direction parallel to the surface to be wiped.

11. A windshield wiper blade assembly as set forth in claim 10 wherein said fibers are dispersed uniformly through the cross-section of said vertebra body.

12. A windshield wiper blade assembly as set forth in claim 10 wherein said fibers form between 63% and 82% of the cross-sectional area of said vertebra body.

13. A windshield wiper blade assembly as set forth in claim 10 wherein said fibers form between 67% and 77% of the cross-sectional area of said vertebra body.

14. A windshield wiper blade assembly as set forth in claim 10 wherein said fibers form 75% of the cross-sectional area of said vertebra body.

15. A windshield wiper blade assembly as set forth in claim 10 wherein said fibers are glass fibers.

16. A windshield wiper blade assembly as set forth in claim 10 wherein said resinous material is a thermoset plastic.

17. A windshield wiper blade assembly as set forth in claim 10 wherein said resinous material is vinyl ester.

* * * * *